United States Patent [19]

Sylvester, Jr. et al.

[11] E Patent Number: Re. 33,345

[45] Reissued Date of Patent: Sep. 18, 1990

[54] TOROID TRANSFORMERS AND SECONDARY WINDINGS

[75] Inventors: Robert D. Sylvester, Jr., Dover; Paul C. Horn, Somersworth; Vincent J. Bober, Rochester, all of N.H.

[73] Assignee: GFS Manufacturing Company, Inc., Dover, N.H.

[21] Appl. No.: 68,633

[22] Filed: Jun. 30, 1987

Related U.S. Patent Documents

Reissue of:

[64] Patent No.: 4,631,511
Issued: Dec. 23, 1986
Appl. No.: 707,135
Filed: Mar. 1, 1985

[51] Int. Cl.[5] ..... H01F 27/28

[52] U.S. Cl. ..... 336/180; 336/186; 336/205; 336/226; 336/229

[58] Field of Search ..... 336/229, 222, 205, 206, 336/200, 223, 170, 180, 186

[56] References Cited

U.S. PATENT DOCUMENTS

| | | | |
|---|---|---|---|
| 243,180 | 6/1881 | Wane | 336/206 X |
| 901,299 | 10/1908 | Kifsee | 336/206 X |
| 2,550,891 | 5/1951 | Wald | 336/170 X |
| 2,599,182 | 6/1952 | Kerns | 336/222 |
| 2,971,173 | 2/1961 | Kajihara | 336/229 X |
| 3,102,245 | 8/1963 | Lawson, Jr. | 336/200 X |
| 3,149,296 | 9/1964 | Cox | 336/229 X |
| 3,168,715 | 2/1965 | Woodworth | 336/170 X |
| 3,243,750 | 3/1966 | Collins | 336/229 X |
| 3,263,191 | 7/1966 | Arvonio | 336/229 |
| 3,363,165 | 1/1968 | Wilkinson | 336/170 X |
| 3,458,650 | 7/1969 | Miyawaki et al. | 336/222 X |
| 3,458,843 | 7/1969 | Lord | 336/229 X |

FOREIGN PATENT DOCUMENTS

| | | | |
|---|---|---|---|
| 1044342 | 12/1978 | Canada | 336/205 |
| 2541871 | 3/1977 | Fed. Rep. of Germany | 336/205 |
| 2602668 | 7/1977 | Fed. Rep. of Germany | 336/180 |
| 580898 | 11/1924 | France | 336/223 |
| 77117 | 6/1980 | Japan | 336/205 |
| 52117 | 3/1982 | Japan . | |
| 190008 | 11/1983 | Japan . | |
| 149503 | 11/1962 | U.S.S.R. . | |
| 221594 | 9/1924 | United Kingdom | 336/205 |
| 674108 | 6/1952 | United Kingdom | 336/223 |
| 918978 | 2/1963 | United Kingdom | 336/170 |

*Primary Examiner*—Thomas J. Kozma
*Attorney, Agent, or Firm*—Daniel H. Kane, Jr.

[57] ABSTRACT

Secondary winding configurations and methods particularly applicable for toroid transformers are described for winding secondary windings over the indexed primary winding and toroidal core. The secondary winding is formed in the configuration of a multifilar winding of a plurality of coplanar parallel filaments with a first elongate strip of electrically insulating material bonded to the filaments on one side and a second elongate strip of electrically insulating material bonded to the filaments on the other side and to the first elongate strip. The resulting electrically insulated multifilar strap winding contains the filaments in substantially parallel coplanar relationship. The mulfifilar strap winding is wound around the toroidal core in substantially equally spaced turns. The strap winding maintains the filaments substantially in equally spaced relationship relative to each other over irregular surfaces and compound curvature of the toroidal core without crossover. Mutual inductance between the secondary winding of the invention and the primary winding is optimized while leakage inductance is minimized. The invention is applicable for high frequency switching transformers used in the power supplies of microprocessors and computer accessories where losses and spikes from leakage reactance must be minimized.

16 Claims, 6 Drawing Sheets

FIG. 9
(PRIOR ART)
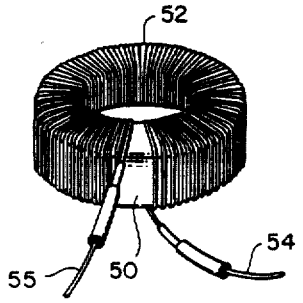
FIG. 10
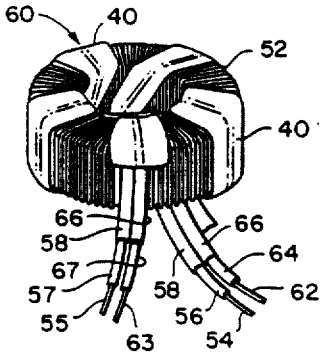
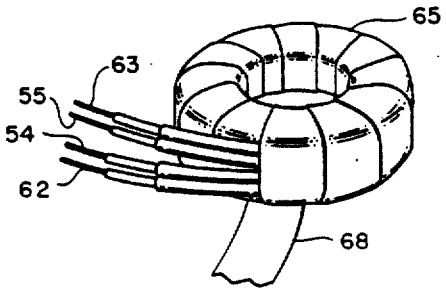
FIG. 11

TOROID TRANSFORMERS AND SECONDARY WINDINGS

Matter enclosed in heavy brackets [ ] appears in the original patent but forms no part of this reissue specification; matter printed in italics indicates the additions made by reissue.

TECHNICAL FIELD

This invention relates to secondary winding configurations and methods particularly applicable in toroid transformers such as high frequency switching transformers used in switch mode power supplies for microprocessors, computers, and accessories.

BACKGROUND ART

Transformers for power supplies in computers and accessories must meet the demanding requirements of computing equipment for low losses in the switching mode and elimination of spikes in the output. Such losses typically result from leakage inductance and consequent leakage reactance caused by irregular spacing of the secondary windings relative to the primary windings. The leakage inductance is inversely related to mutual inductance coupling between the windings and results in a lower coefficient of coupling between the windings. Manufacturers generally require very low levels of leakage inductance. For example, the leakage inductance specification for a power supply transformer used with microprocessor computers and accessories is 45 microhenries (μh) maximum.

This low specification for leakage inductance is difficult to achieve in toroid transformers with multiple secondary and tertiary and windings with intermediate insulating layers wound over the primary winding and toroidal core. The complex winding configurations must frequently be wound and placed by hand. The compound curvature of the core and the irregular surfaces produced by the complex of windings and insulating layers make it difficult to achieve regular and optimal spacing of the secondary windings relative to the primary winding for maximizing mutual inductance coupling.

Multifilar secondary windings are particularly prone to irregularity in the spacing of the multiple filaments on toroid transformers. The parallel filaments which comprise each turn of the multifilar secondary are used to achieve greater distribution and more even distribution of the secondary winding turns over the primary winding and therefore greater mutual coupling. However, irregularity and unevenness in the equal spacing of the parallel filaments of the multifilar secondary winding and crossover of the filaments interferes in the mutual inductance coupling and increases leakage inductance. Such irregular spacing and crossover of filaments is a particular problem on toroidal cores and in toroid transformers because of the irregular surfaces over which the multifilar secondaries must be wound, often by hand.

OBJECTS OF THE INVENTION

It is therefore an object of the present invention to provide new multifilar secondary windings, configurations, and methods particularly applicable for toroid transformers which maintain substantially even spacing between the filaments of the multifilar winding for minimizing leakage inductance and optimizing mutual inductance coupling with the primary winding.

Another object of the invention is to provide toroid transformers with secondary winding configurations and arrangements which achieve and surpass leakage inductance specifications for computing equipment transformer standards achieving leakage inductances as low as 26 to 36 μh as an example.

A further object of the invention is to provide new multifilars secondary windings and methods which are adaptable to automated manufacture and machine winding, which themselves function as insulating layers on the transformer, and which eliminate some of the winding steps typically implemented by hand in manufacturing and winding high frequency switching toroid transformers.

DISCLOSURE OF THE INVENTION

In order to accomplish these results the present invention provides a new secondary winding configuration particularly applicable for toroid transformers and a new method for winding secondary windings over the indexed primary winding and toroidal core. The invention contemplates the method of forming the secondary winding in the configuration of a multifilar winding of a plurality of coplanar parallel filaments, bonding a first elongate strip of electrically insulating material to the filaments on one side and bonding a second elongate strip of electrically insulating material to the filaments on the other side and to the first elongate strip to provide an electrically insulated multifilar strap winding containing the filaments in substantially parallel coplanar relationship. The invention then provides the step of winding the multifilar strap winding around the toroidal core in substantially equally spaced turns.

A feature and advantage of this secondary winding configuration and winding method is that the strap winding maintains the filaments substantially in equally spaced relationship relative to each other on the toroidal core without crossover. Mutual inductance between the secondary winding of the invention and the primary winding is optimized while leakage inductance is minimized. The invention is therefore applicable for high frequency switching transformers used in the power supplies of microprocessors and computer accessories where losses and spikes from leakage reactance must be minimized.

In a preferred example, the first and second elongate strips of electrically insulating material are strips of tape formed with an adhesive layer on one side and the strips of tape are adhesively bonded to the filaments of the multifilar winding on either side and to each other. For a multifilar winding of wide distribution and spacing between the filaments, the adhesively bonded strips maintain substantially equal spacing between adjacent filaments. Alternatively, where the filaments are arranged adjacent to each other in substantially contiguous relationship, the bonded strips of the multifilar strap winding nevertheless maintain the filaments in substantially parallel coplanar relationship without crossover.

A number of secondary and tertiary strap windings, according to the invention, are described such as trifilar and quadrifilar strap windings. A feature and advantage of the insulated laminating tertiary and secondary strap windings is that new toroid transformer configurations are provided meeting demanding specifications for low leakage flux, leakage induction, and leakage reactance along with a new simplified method for winding the toroid transformer which eliminates a number of the conventional winding steps.

For example, according to the method of the present invention a number of conventional insulation winding steps for adding insulating layers required between windings are eliminated. The new secondary strap winding itself incorporates insulating layers on either side of the multifilar filaments and the strap itself functions as an insulating layer on the transformer.

Other objects, features and advantages of the invention are set forth in the following specification and accompanying drawings.

BRIEF DESCRIPTION OF THE DRAWINGS

FIG. 9 is a perspective view of a conventional toroidal core with an indexed primary winding in place on the core.

FIG. 10 is a perspective view of a tertiary secondary strap winding in place over the toroid transformer core and primary winding according to the invention.

FIG. 11 is a perspective view of a completed layer of one of three layers of insulating tape wrapped over the primary and tertiary windings.

FIG. 13 is a perspective view of the toroid transformer of FIG. 12 showing a further step in winding the quadrifilar secondary strap winding while

DESCRIPTION OF PREFERRED EXAMPLE EMBODIMENTS AND BEST MODE OF THE INVENTION

Figure 1:
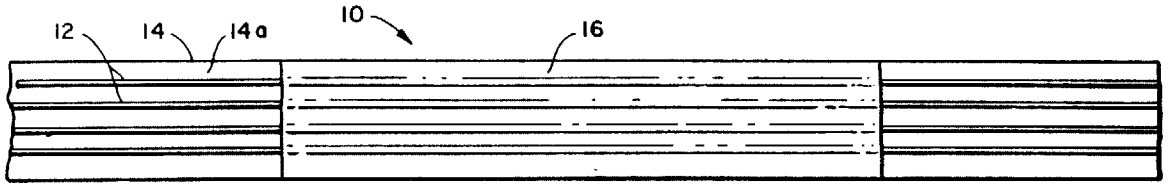
FIG. 1 is plan view of a quadrifilar secondary strap winding according to the present invention.

A quadrifilar secondary strap winding 10 provided by the invention is illustrated in FIG. 1, consisting of four spaced apart but equally spaced copper wires or filaments 12, a first strip or layer of insulating tape 14 with an adhesive layer 14a facing and bonded to the filaments 12, and a second strip or layer 16 of insulating tape with an adhesive layer facing and bonded to the filaments and to the first strip of insulating tape 14. The adhesive bonding of the strips of insulating tape 14 and 16 to each other in the spaces between the filaments 12 maintain and assures the equal spacing of the filaments 12 relative to each other without crossover even on irregular surfaces and surfaces of compound curvature as hereafter described.

Figure 2:
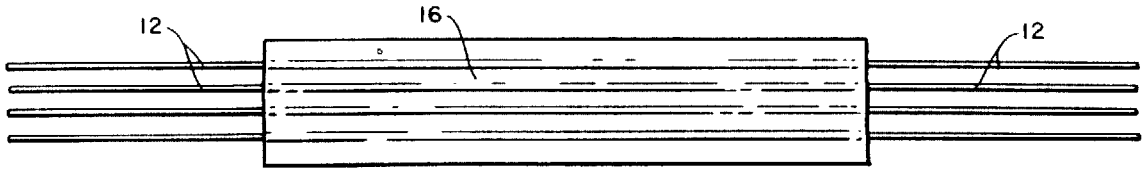
FIG. 2 is another plan view of the quadrifilar secondary strap winding with the overlapping back strip of electrically insulating tape cut away exposing the filament leads.
Figure 3:
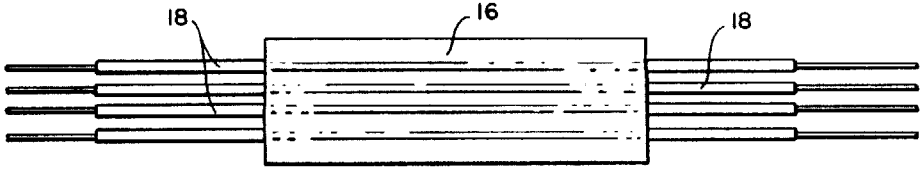
FIG. 3 is a plan view of the quadrifilar secondary strap winding of FIG. 2 with color coded tubing inserted over the filaments.
Figure 4:
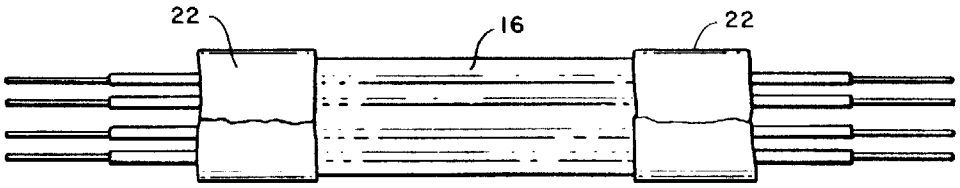
FIG. 4 is a plan view of the quadrifilar secondary strap winding of FIG. 3 ready for winding around the toroidal core of a transformer with wrap around tape holding the color coded tubing in place.

As shown in FIG. 1 the strap winding 10 is initially formed with the first or back strip of insulating tape 14 overlapping and extending beyond the second or front strip 16 to the full length of the filaments 12 adhesively bonding to the filaments on one side. By this arrangement the integrity and spacing of the filaments 12 is maintained during handling prior to final preparation. On the other hand, the single strip 14 can be easily peeled back from the filaments 12 and cut at the desired length, for example, a length equal to the second or front strip 16 as shown in FIG. 2 in preparation for receiving color coded insulating tubing 18 as illustrated in FIG. 3 for lead identification. The color coded tubing leads are held in place adjacent to the elongate strips of insulating tape 14 and 16 by wraparound insulating tape 22 to provide the completed quadrifilar secondary strap winding 20 as illustrated in FIG. 4 ready for winding, for example, on a toroid transformer as hereafter described.

Figure 5:
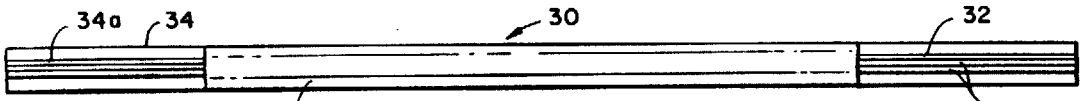
FIG. 5 is a plan view of a trifilar secondary strap winding according to the invention.

A trifilar secondary strap winding 30, according to the invention, is illustrated in FIG. 5. As shown in this example, the trifilar winding is formed by three filaments 32 adjacent to each other in substantially contiguous relationship with a first strip 34 of insulating tape on one side of the filaments 32 with an adhesive layer 3a facing and adhesively bonding to the filaments 32, and a second elongate strip 36 of insulating tape on the other side or front side of the filaments 32 with an adhesive layer facing and adhesively bonding to the three adjacent contiguous filaments 32 and to the first strip of insulating tape 34 on either side of the three filaments. The adhesive bonding of the strips of dielectric or electrically insulating tape 34 and 36 to the filaments 32 and to each other on either side of the filaments maintains the filaments in coplanar parallel relationship without crossover for winding on irregular surfaces as hereafter described.

Figure 6:
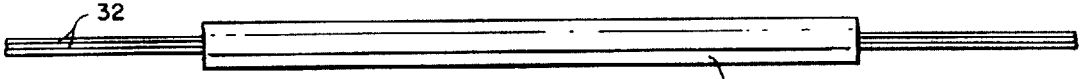
FIG. 6 is a plan view of the trifilar secondary strap winding of FIG. 5 with the overlapping back strip of electrically insulating tape cut away exposing the filaments.

The first strip or back strip 34 of insulating tape overlaps and extends beyond the ends of the second strip of tape 36 to the full length of the filaments 32. By this initial configuration, the integrity and arrangement of the ends of the filaments are maintained intact while subsequently permitting the overlapping strip 34 to be peeled back and cut at a desired length, for example, equal to the second strip or front strip 36 as shown in FIG. 6 exposing the ends of the filaments 32 for leads. Thus, the expedient, according to the invention, of using an overlapping strip extending the full length of the filaments on one side as shown in the examples of FIGS. 1 and 5 avoids the disadvantage attendant upon extending both strips the full length of the filaments where the adhesive bonding of the strips of tape to each other would make it difficult to peel back and expose the ends of the filaments for leads. While the single layer of overlapping tape at the ends affords adequate protection, it also permits each "peelback" for cutoff at a desired length to receive, for example, color coded insulating tubing over the ends of the filaments as shown in FIGS. 3 and 4 and as also maybe accomplished in a similar manner over the ends of the filaments 32 in FIG. 6.

Figure 7:
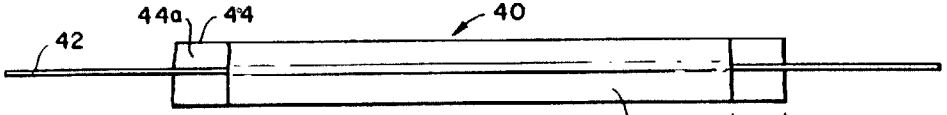
FIG. 7 is a plan view of a monofilament strap winding according to the invention suitable for use, for example as a tertiary winding on a toroid transformer.

A single filament strap winding 40 useful, for example, as a tertiary winding is shown in FIG. 7 and is formed with a single copper wire or filament 42, a first strip or back strip 44 of electrically insulating tape having an adhesive layer 44a facing and adhesively bonding to the filament 42, and a second strip 46 of electrically insulating tape on the other side with an adhesive layer facing and adhesively bonding to the single filament 42 and to the first strip 44 on either side thereby maintaining the filament 42 in linear condition between the strips of tape. In the example of FIG. 7 the first strip 44 along the back of filament 42 is initially cut or subsequently peeled back and cut to expose the ends of the filament but still overlap and extend beyond the first strip 46 so that the overlapping length 45 of the strip of tape 44 is available to wraparound and adhere to, for example, color coded tubing 48 placed over the ends of the filament to retain the tubing adjacent to the ends of the tape. In this example black PVC tubing 48 coaxially surrounds the inner color coded tubing 49.

Figure 8:
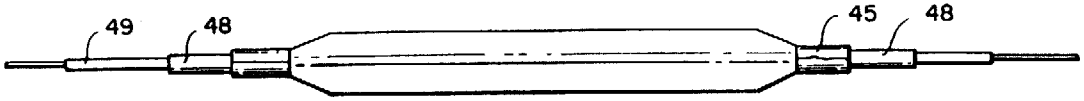
FIG. 8 is a plan view of the monofilament tertiary strap winding of FIG. 7 with color coded tubing in place over the ends of the filament and with the overlapping back strip of electrically insulating tape cut for folding over and wrapping to hold the color coded tubing in place.

The mulfilar secondary strap windings are filament wire sizes typically used in transformer windings such as #20 or #22 copper wire. For the strips of electrically insulating material, adhesive tape of dielectric or insulating material may be used such as, for example, #1298 Mylar (TM) tape or #10 Mylar (TM) tape, available from 3M Company, having a width appropriate to the distribution and spacing of the flat multifilar filaments in the strap. For example, for a quadrifilar secondary strap winding such as illustrated in FIG. 1–4, #1298 Mylar (TM) tape having a width of 1 inch (2.5 cm) is appropriate. For a thinner strap such as the trifilar secondary winding strap of FIGS. 5 and 6 a tape width of ¼ inch (0.6 cm) provides sufficient overlap on the sides. Alternatively, a combination of different gauge tapes may be used such as #1298 tape on one side and #10 tape on the other side. For the color coded insulating tubing at the lead ends of the filaments, Teflon (TM) tubing or PVC tubing are typically used. In the monofilament tertiary strap winding illustrated in FIGS. 7 and 8 a tape wider than the trifilar strap winding is used such as, for example, tape of ⅜ inch (1 cm) to provide a wider insulating layer function and retain the winding in place during wrapping.

A toroid transformer incorporating the new secondary winding configuration and winding method is illustrated in FIGS. 9–16. As shown in FIG. 9 the manufacturing steps or transformer winding steps begin with a conventional torus or toroidal core 50 of magnetically permeable material such as ceramic ferrite material with indexed turns of primary winding 52 equally spaced around the core 50. The primary winding 52 is typically machine wound and in this example is formed by 80 indexed turns. The leads 54 and 55 of the primary winding are color coded for lead identification with, for example, yellow electrically insulating tubing 56 such as Teflon (TM) tubing and white Teflon (TM) tubing 57 respectively as shown in FIG. 10. The yellow and white tubing 56 and 57 respectively are in turn covered by black tubing 58 such as black PVC tubing to meet lead wire specifications. Typically, #19 tubing is used for the color coded inner yellow tube 56 and white tube 57 while a shorter length of 190 13 tubing coaxially slides over the inner tubing.

Five turns of a tertiary winding 60 are wound equally spaced around the primary winding 52 using a monofilament strap winding 40 of the type illustrated in FIG. 7. In this example the leads 62 and 63 of the monofilament tertiary strap winding 40 are color coded with black inner tubing 64 and blue inner tubing 67 respectively with further lead protection provided by black PVC outer tubing 66.

The tertiary winding 60 is included in the transformer for sensing the voltage output and pulse width on the primary winding 52 and is typically hand wound. The monofilament strap winding configuration 40 according to the invention facilitates equal spacing and distribution of tertiary winding around the toroid and at the same time provides insulating layers on either side of the monofilament, between the monofilament and adjacent underlying and overlying windings. The step of winding a separate layer in insulating tape between the primary and tertiary windings is therefore eliminated.

Computing equipment standards then typically require several insulating layers 65 over the primary winding before adding the secondary windings. The insulating layers 65 are typically provided by wrapping several layers of insulating tape 68 around the torus appropriately positioning the respective lead wires 54, 55, and 62, 63 during the wrapping of each layer, lapping the tape over successive laps and the tubing of the lead wires in a prescribed manner in each instance.

Figure 12:
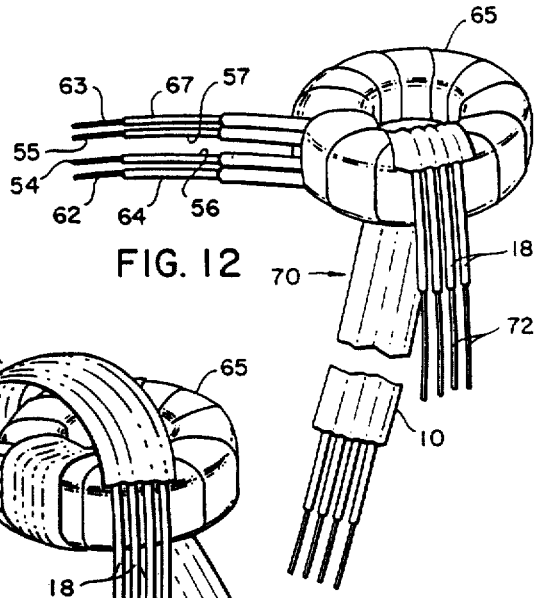
FIG. 12 is a diagrammatic view of the toroid transformer of FIG. 11 with the uneven surface of the insulating layers simplified to show diagrammatically a smooth torus or donut and showing the first step in winding a quadrifilar secondary strap winding of equally spaced apart filaments around the toroid.
Figure 13:
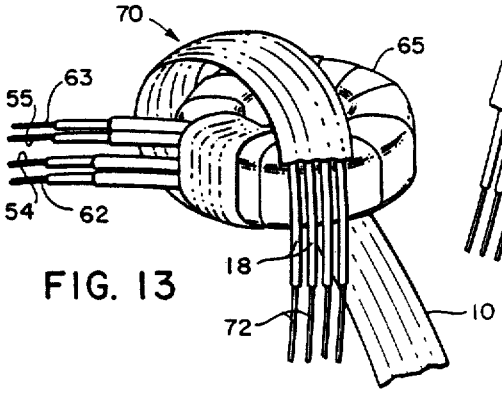
Figure 14:
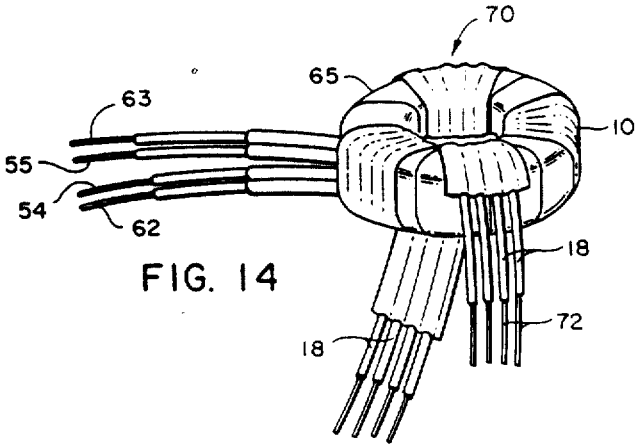
FIG. 14 is a perspective view of the toroid transformer with the winding of the quadrifilar secondary strap winding in four equally spaced turns around the torus completed.

In FIG. 12 the partially completed torus and insulating layer 65 which is actually a cylindrical toroid is shown diagrammatically as a smooth annulus or donut in FIGS. 12–14 for clarity in illustrating the steps of wrapping or winding the first multifilar secondary strap winding 70. The strap winding 70 is in the same configuration as the quadrifilar strap winding 10 of FIGS. 1–4 with sufficient length to provide four complete turns around the torus. As heretofore described the filaments 72 of quadrifilar strap winding 70 are spaced apart and distributed with equal spacing between the filaments to optimize mutual coupling between the secondary winding 70 and primary winding 52 by better distribution of each turn of the secondary winding 70 over the toroid. As shown in FIGS. 13 and 14, the four turns of the flat quadrifilar secondary strap winding 70 are wrapped around the toroid with equal spacing between the turns placing the leads of the filaments 72 and color coded lead filament tubing 18 at the desired position on the toroid relative to the leads 62 and 63 of the monofilament tertiary strap winding 40 and leads 54 and 55 of the primary winding 52.

The first secondary strap winding 10 with 4 turns of the parallel filaments distributed over the 80 turns of the primary winding provides a turn ratio of 1 to 20. With standard line voltage, e.g. 110 volts, applied to the primary winding, the first secondary winding 10 provides the 5 volt power supply leads.

A feature and advantage of the multifilar secondary strap winding configuration and method according to the invention is that the laminar construction of the insulating strips and intermediate filaments maintains the filaments with substantially uniform and equal spacing over the toroid relative to the primary winding and in particular the turns of the primary winding. Thus, while there is greater spacing between the 80 turns of the primary winding on the outside of the toroidal core and closer spacing on the inside, the spacing between the indexed cores is substantially the same at any particular circular cross-section. Similarly, the secondary strap winding configuration 70, according to the invention, at each turn around the toroid maintains the filaments with substantially equal spacing relative to each other with greater spacing at the outside of the torus and closer spacing on the inside but with a complementary uniformity relative to the primary turns. This conformational wrapping of the secondary strap winding relative to the primary winding afforded by the present invention optimizes mutual inductance between the primary and secondary winding and minimizes leakage inductance and losses from consequent leakage reactance. The conformational uniformity is attributable to the secondary winding configuration and method, according to the present invention, for exceeding the most demanding tolerances for low leakage flux, leakage inductance and leakage reactance.

Figure 15:
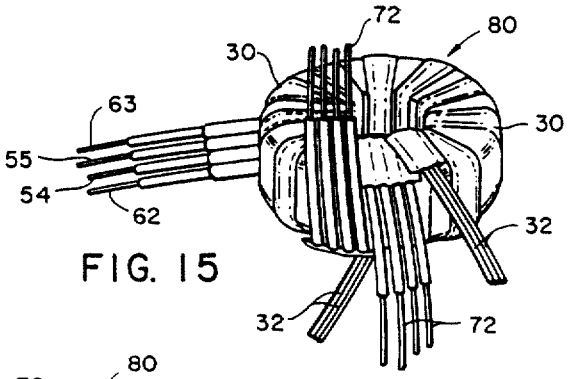
FIG. 15 is a perspective view of the toroid transformer of FIG. 14 with a trifilar secondary strap winding wound in equally spaced turns directly over the quadrifilar secondary strap winding, according to the invention, without winding an intermediate layer of electrically insulating tape.
Figure 15A:
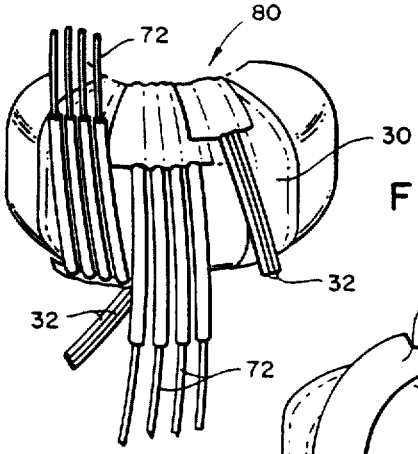
FIG. 15A is a detailed fragmentary view of FIG. 15.

Another feature and advantage of the strap winding method according to the present invention is that time consuming and labor intensive steps in the manufacture of the toroid transformer are eliminated. For example, as shown in FIG. 10 the tertiary sensor filament with insulating layers on either side is wrapped or wound in a single step thereby eliminating the prior art step of wrapping an insulating layer such as a layer of tape around the primary beneath the tertiary winding and before placement of the tertiary winding. Because this is typically a manual winding step, there is substantially savings in labor intensive time and expense. Similarly, upon completion of winding of the first secondary strap winding 70, a second secondary strap winding 80 may be placed directly over the first secondary winding as shown in FIG. 15. According to the present invention, the strap windings function not only as filament windings but also at the same time constitute insulating layers on either side of the filaments. While the laminar strips such as insulating tape on either side maintain the filaments in optimal uniform conformations relative to the primary winding for minimizing leakage inductance and reactance, the insulating strips at the same time can eliminate manual winding steps by delivering insulating layers in place with the filaments.

Figure 16:
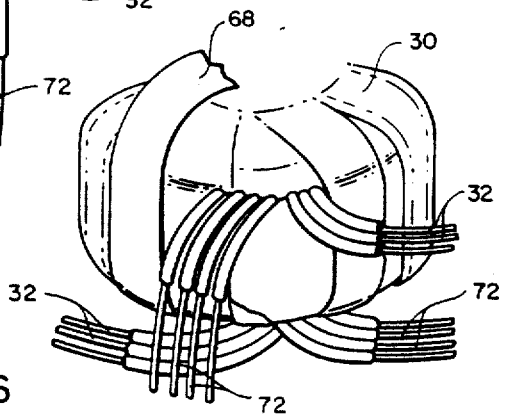
FIG. 16 is a detailed fragmentary view of the portion of the toroid transformer showing the leads from the secondary strap windings and the step of wrapping with a final single layer of electrically insulating tape.

As shown in FIG. 15, a second secondary winding 80, for example in the configuration of the trifilar secondary strap winding 30 of FIGS. 5 and 6 is wound or wrapped in twelve equally spaced turns around the torus and over the first secondary winding 70 with the trifilar filament leads 32 placed in the desired position relative to the leads of the other windings. A final insulating layer is then wrapped or wound over the second secondary using, for example, #20 insulating tape and the tape 68 is wrapped in a prescribed manner with overlapping, etc. for placement of the lends of the lead wire in a desired configuration as shown in FIG. 16.

The second secondary strap winding 30 with 12 turns of the parallel filaments distributed over the 80 turns of the primary winding provides a turn ratio of 0:6.6. With standard line voltage applied to the primary winding, the second secondary strap winding 30 provides the 16 volt power supply leads.

While the invention has been described with reference to particular example embodiments, it is intended to cover all variations and equivalents within the scope of the following claims.

We claim:

1. A toroid transformer having a primary winding with indexed turns distributed evenly around a toroidal core of permeable material and a plurality of separate multifilar secondary windings formed in separate layers over the indexed primary winding and around the toroidal core where the toroid transformer is characterized by a relatively high ratio of primary winding turns to secondary winding turns of approximately at least 6 and the secondary windings are formed over the compound curvature and irregular surface layers of the toroid transformer comprising:

a plurality of layers of electrically insulating tape formed over the primary winding around the toroidal core, each layer comprising successive overlapping turns of tape of elongate strip configuration, each turn lapping adjacent turns thereby increasing distance over material surfaces between layers;

a multifilar first secondary strap winding formed over the indexed turns of the primary winding and layers of electrically insulating tape in substantially equally spaced turns around the toroidal core, said first secondary strap winding comprising a flat array of a plurality of coplanar parallel secondary winding filaments electrically coupled in parallel, a first elongate strip of electrically insulating tape having an adhesive layer on one side adhesively bonded to one side of the multiple filaments, and a second elongate strip of electrically insulating tape having an adhesive layer on one side adhesively bonded to the other side of the filaments and to the first elongate strip, said first and second elongate strips being wider than the flat array of multiple filaments thereby forming a margin of two strips of adhesively bonded tape along the sides of the first secondary strap winding extending beyond the outside filaments of the first secondary strap winding thereby increasing distance over material surfaces between separate winding layers, the filaments of the first secondary strap winding being maintained in substantially equally spaced relationship relative to each other without crossover and relative to the turns of the primary winding over the compound curvature and uneven surfaces of the layers around the toroidal core by the first and second elongate strips adhesively bonded to each other and to the multiple filaments of the first secondary strap winding thereby optimizing mutual inductance between the first secondary strap winding and the primary winding and minimizing leakage inductance;

a second secondary strap winding formed directly over the first secondary strap winding in substantially equally spaced turns around the toroidal core without a separate electrically insulating layer of tape between the first and second secondary strap windings, said second secondary strap winding comprising a flay array of a plurality of coplanar parallel secondary winding filaments electrically coupled in parallel, a first elongate strip of electrically insulating tape having an adhesive layer on one side adhesively bonded to one side of the filaments, a second elongate strip of electrically insulating tape having an adhesive layer on one side adhesively bonded to the other side of the filaments and to the first elongate strip, said first and second elongate strips being wider than the flat array of multiple filaments of the second secondary strap winding forming a margin of two strips of adhesively bonded tape along the sides of the second secondary strap winding extending beyond the outside filaments of the second secondary strap winding thereby increasing distance over material surfaces between separate winding layers, the multiple filaments of the second secondary strap winding being maintained in substantially equal spaced relationship relative to each other without crossover and relative to the turns of the primary winding over the compound curvature and uneven surfaces of the layers around the toroidal core thereby optimizing mutual inductance between the primary winding and the second secondary strap winding and minimizing leakage inductance.

2. The toroid transformer of claim 1 wherein the multifilar first secondary strap winding comprises a plurality of filaments spaced apart from each other with substantially equal spacing between the filaments.

3. The toroid transformer of claim 2 wherein the multifilar first secondary strap winding comprises a quadrifilar winding.

4. The toroid transfromer of claim 1 further comprising a tertiary winding comprising at least one filament, a first elongate strip of electrically insulating tape having an adhesive layer on one side adhesively bonded to one side of the filament and a second elongate strip of electrically insulating tape having an adhesive layer on one side adhesively bonded to the other side of the filament and to the first elongate strip, said elongate strips being wider than the filament forming a margin of two strips of adhesively bonded tape along the sides of the tertiary strap winding extending beyond the filament on each side thereby increasing distance over material surfaces between separate winding layers, said tertiary winding being formed directly over the indexed turns of the primary winding in substantially equally spaced turns around the toroidal core without a separate layer of electrically insulating tape being formed between the primary winding and the tertiary winding.

5. The toroid transformer of claim 4 wherein the tertiary winding comprises a single filament.

6. The toroid transformer of claim 5 further comprising a final layer of electrically insulating tape formed over the multifilar first and second secondary strap windings around the toroidal core, said final layer comprising successive overlapping turns of elongate strip configuration electrically insulating tape, each turn lapping adjacent turns.

7. A toroid transformer having a primary winding with indexed turns distributed substantially equally around a toroidal core of permeable material and a plurality of separate multifilar secondary windings formed in separate layers over the primary winding around the toroidal core where the toroid transformer is characterized by a relatively high ratio of primary winding turns to secondary winding turns for each of the separate secondary windings and the secondary windings are formed over the compound curvature and irregular surface layers to the toroid transformer comprising:

a plurality of layers of electrically insulating tape of elongate strip configuration formed over the primary winding, each layer comprising successive overlapping turns of tap wrapped around the toroid, each turn lapping adjacent turns thereby increasing distance over material surfaces between the layers;

a multifilar first secondary strap winding formed over the primary winding and layers of electrically insulating tape in substantially equally spaced turns around the toroidal core, said first secondary strap winding comprising a flat array of a plurality of coplanar parallel secondary winding filaments electrically coupled in parallel, a first elongate strip of electrically insulating tape having an adhesive layer on one side adhesively bonded to one side of the filaments, and a second elongate strip of electrically insulating tape having an adhesive layer on one side adhesively bonded to the other side of the filaments and to the first elongate strap providing a unitary flat secondary strap winding, said first and second elongate straps being wider than the flat array of multiple filaments thereby forming a margin of two strips of adhesively bonded tape along the sides of the first secondary strap winding extending beyond the outside filaments of the first secondary strap winding thereby increasing distance over material surfaces between separate winding layers, the filaments of said first secondary strap winding formed around the toroidal core being maintained in substantially equally spaced relationship relative to each other without crossover and to the indexed turns of the primary winding over the compound curvature and irregular surfaces of the toroid transformer by the first and second elongate strips bonded to each other and to the filaments thereby optimizing mutual inductance between the primary winding and first secondary winding and minimizing leakage inductance;

a multifilar second secondary strap winding formed directly over the first secondary strap winding in substantially equally spaced turns around the toroidal core without a separate layer of electrically insulating tape between the first and second secondary strap windings, said second secondary strap winding also comprising a flat array of a plurality of coplanar parallel secondary winding filaments electrically coupled in parallel, a first elongate strip of electrically insulating material tape having an adhesive layer on one side adhesively bonded to one side of the filaments, and a second elongate strip of electrically insulating tape having an adhesive layer on one side adhesively bonded to the other side of the filaments and to the first elongate strip forming a unitary a flat second secondary strap winding, said first and second elongate strips being wider than the flat array of multiple filaments thereby forming a margin of two strips of adhesively bonded tape along the sides of the second secondary strap winding extending beyond the outside filaments of the second secondary strap winding thereby increasing distance over material surfaces between separate winding layers, the multiple filaments of the second secondary strap winding formed over the first secondary strap winding around the toroidal core being maintained substantially in equally spaced relationship relative to each other without crossover and to the indexed turns of the primary winding over the compound curvature and irregular surface layers of the toroid transformer by the first and second elongate strips of electrically insulating tape adhesively bonded to each other and on each side of the filaments thereby optimizing mutual inductance between the primary winding and the second secondary strap winding and minimizing leakage inductance;

and a tertiary strap winding comprising at least one filament, a first elongate strip of electrically insulating tape having an adhesive layer on one side adhesively bonded to one side of the filament and a second elongate strip of electrically insulating tape having an adhesive layer on one side adhesively bonded to the other side of the filament and to the first elongate strip to provide a unitary flat tertiary strap winding, said first and second elongate strips being wider than the flat array of multiple filaments thereby forming a margin of two strips of adhesively bonded tape along the sides of the tertiary winding extending beyond the outside filaments of the tertiary winding thereby increasing distance over material surfaces between separate winding layers, said tertiary strap winding being formed in substantially equal turns directly over the indexed turns of the primary winding without a separate layer of electrically insulating tape between the primary winding and the tertiary strap winding.

8. The toroid transformer of claim 7 wherein said first secondary strap winding comprise multiple filaments spaced apart from each other with substantially equal spacing between the filaments.

*9. In a toroid transformer having an annular core of permeable material about which radially is wound a toroidal primary winding, and about which radially is wound at least one toroidal secondary winding;*

*the improvement wherein at least the secondary winding comprises a flat, multifilar strap which includes a plurality of filaments arranged in substantially parallel, coplanar relationship, and elongate strip means of electrically insulating material underlying and overlying the plurality of filaments,*

*the flat, multifilar strap secondary winding providing for maintaining the substantially parallel, coplanar relationship of the filaments without crossover during radial toroidal winding about curved or irregular toroid surfaces, and providing electrical insulation between turns of the multifilar strap secondary winding and between the secondary and primary windings.*

*10. The transformer of claim 9 wherein the elongate strip means of electrically insulating material is adhered to the parallel, coplanar filaments.*

*11. The transformer of claim 9 wherein the elongate strip means includes a first elongated strip of electrically insulating material underlying and adhered to the parallel, coplanar filaments, and a second elongated strip of electrically insulating material overlying and adhered to the filaments and to the first elongated strip.*

*12. The transformer of claims 10 or 11 wherein the elongate strip means of insulating material have an adhesive layer.*

*13. The transformer of claims 9, 10, or 11 wherein there are plural winding straps.*

*14. The transformer of claim 13 wherein at least one of the winding straps is a flat strap having a single filament.*

*15. The transformer of claim 9 further including at least one further winding which comprises a flat strap which includes at least one filament, and elongate strip means of electrically insulating material underlying and overlying and adhered to the at least one filament,*

*the further flat strap winding providing for radial toroidal winding about curved or irregular toroid surfaces without crossover, and providing electrical insulation between turns of the further strap winding and between the further winding and the other windings.*

*16. In a toroid transformer having an annular core of permeable material about which radially is wound a toroidal primary winding, and about which radially is wound at least one toroidal secondary winding and at least one tertiary winding;*

*the improvement wherein the at least one secondary winding comprises a flat, multifilar strap winding which includes a plurality of filaments arranged in substantially parallel, coplanar relationship, and elongate strip means of electrically insulating material underlying and overlying and adhered to the plurality of filaments,*

*the flat, multifilar strap secondary winding providing for maintaining the substantially parallel, coplanar relationship of the filaments without crossover during radial toroidal winding about curved or irregular toroid surfaces, and providing electrical insulation between turns of the secondary winding and between the secondary winding and other windings, and wherein*

*the at least one tertiary winding comprises a flat strap which includes at least one filament, and elongate strip means of electrically insulating material underlying and overlying and adhered to the at least one filament to provide a strap winding for radial toroidal winding about curved or irregular toroid surfaces without crossover, and providing electrical insulation between turns of the tertiary strap winding and between the tertiary winding and the other windings.*

* * * * *